United States Patent [19]

Hegarty

[11] Patent Number: 5,276,591
[45] Date of Patent: Jan. 4, 1994

[54] SIGN WITH INDIRECT ILLUMINATION FROM LIGHT EMITTING DIODES

[76] Inventor: William Hegarty, 213 Columbia La., Stevensville, Md. 21666

[21] Appl. No.: 918,646

[22] Filed: Jul. 23, 1992

[51] Int. Cl.$^5$ .............................................. F21V 7/04
[52] U.S. Cl. .......................................... 362/31; 362/27
[58] Field of Search ............................... 362/26, 27, 31

[56] References Cited

U.S. PATENT DOCUMENTS

| | | | |
|---|---|---|---|
| 1,499,688 | 7/1924 | Palmer et al. | 362/31 |
| 2,994,148 | 8/1961 | Endelson | 362/31 |
| 3,406,475 | 10/1968 | O'Donnell | 362/26 |
| 3,892,959 | 7/1975 | Pulles | 362/31 |
| 4,007,985 | 2/1977 | Yevick | 362/31 |
| 4,059,916 | 11/1977 | Tachihara et al. | 362/31 |
| 4,648,690 | 3/1987 | Ohe | 362/26 |
| 5,027,258 | 6/1991 | Schoniger et al. | 362/31 |
| 5,075,826 | 12/1991 | Lah | 362/27 |

FOREIGN PATENT DOCUMENTS 1091225 4/1955 France ................................ 362/31

*Primary Examiner*—Carroll B. Dority
*Attorney, Agent, or Firm*—Eckert Seamans Cherin & Mellott

[57] ABSTRACT

An illuminated sign system using high brightness LEDs and a translucent graphic panel with suitable opacity for the transmission of light. The graphic panel is illuminated by light from the LEDs which is injected into the edge of the graphic panel causing graphics applied to a surface of the graphic panel to become illuminated. Although LEDs produce a very narrow beam of light, uniform lighting of the graphic panel is possible due to the efficient internal reflection of light that occurs within the translucent graphic panel. Light injected into the edge of the graphic panel is efficiently diffused without the uses of a diffusing sheet between the LEDs and the graphic panel. Unlike illuminated signs of illumination that use LEDs for direct illumination of a graphic panel, the invention produces an equivalent level of graphic brightness while requiring fewer LEDs.

13 Claims, 5 Drawing Sheets

SIGN WITH INDIRECT ILLUMINATION FROM LIGHT EMITTING DIODES

BACKGROUND OF THE INVENTION

1. Field of the Invention

This invention relates to the field of illuminated sign systems. In particular, the invention concerns the edge lighting of signs using light emitting diodes or LEDs. The invention utilizes high brightness LEDs aligned so as to inject light directly into the edge of a transparent plate or sheet. The result is a low power, low profile, high visibility, high durability illuminated sign system which is particularly useful for "exit" signs.

2. Prior Art

Light Emitting Diodes or LEDs have been previously applied to the field of illuminated sign systems. A common LED based sign system uses an X-Y matrix of closely spaced LEDs arranged so as to emit light in the direction of the observer. The LEDs in the matrix are selectively illuminated, forming letters, words or graphic symbols. When an LED matrix sign is viewed from distances of less than 100 feet, the graphic patterns produced by the LEDs appears as lines composed of discrete points or dots of light; even at distances in excess of 100 feet the human eye does not readily "merge" the discrete points of light into a continuous form. Although the sign utilizing an X-Y matrix are quite legible, the graphic appearance is not preferred by building owners, architects and specifiers, who recommend evenly illuminated graphics.

LEDs emit light at a wavelength which is predetermined by their semiconductor composition. An illuminated sign system based on a LED matrix is thus limited in the colors that can be displayed. However, there are at least a few color selections available. Although some LED matrix systems allow the user to modify or customize messages for display these systems do not represent an acceptable replacement for illuminated graphic panels, which can be decorated using a wide variety of colors and/or patterns.

Graphic panels for purposes of this disclosure include any panel surfaces having graphics applied by some means such as painting, silk screening, etching, etc., to define indicia by negative or positive means. Graphic panels can be illuminated by several methods of direct or indirect as well as edge lighting. Lighting systems generally direct light from a light source onto either the viewing surface of the graphic panel or through a translucent graphic panel disposed behind the graphic information to be viewed. Edge lighting systems, on the other hand, use a light source to inject light into the edge of a transparent or translucent graphic panel, whereby the panel is caused to glow and any graphics in contact with the panel are made apparent. For example, a message painted on the back side of a panel viewed from the front can be illuminated in this manner, or a panel can be caused to glow generally, the indicia being defined by or between opaque areas on the front side.

LEDs emit a very narrow beam of light, making uniform lighting of large panel surfaces difficult or impossible. LED illumination systems utilizing direct illumination or illumination from behind a translucent diffuser panel, i.e., where light emitted by the LEDs is aimed at a graphic panel in a direction perpendicular to the plane of the graphic panel, produce only marginal uniformity of light intensity over the entire graphic panel unless large numbers of LEDs are used. A diffuse panel helps to spread the LED beams, but diffusers attenuate the light from the source, and thus adversely affect efficiency. A diffuser adds to the cost of the illumination system, adds to the cost of operating the system, and adds dimensional thickness.

The present invention employs the durability and long service life of high brightness LEDs which are now available, and provides more uniform lighting of a graphic panel using an edge lighting technique. Edge lighting takes advantage of internal reflections within the graphic panel, allowing the entire panel to be evenly illuminated using fewer LEDs than conventional methods. Since fewer LEDs are used, the invention results in a cost savings during both manufacture and operation of the sign. The LEDs can be mounted in a row at a housing or mounting portion of a panel which protrudes from a wall or ceiling, resulting in a durable, efficient and aesthetically pleasing illuminated sign structure.

Edge illumination has been employed using fluorescent and incandescent light sources. Systems using fluorescent light sources have several disadvantages since they require complicated circuitry including a ballast reactor (a coil of wire wrapped around a heavy iron core). Fluorescent lighting systems require substantial space for the location of the fluorescent lamps and circuitry, increasing the profile of the sign systems. Additionally fluorescent systems are heavy and fragile when compared to the lighting apparatus of the invention. Incandescent illumination systems also have significant disadvantages since they are relatively inefficient and fragile, and produce a great deal of heat.

SUMMARY OF THE INVENTION

It is an object of the invention to provide an illuminated sign using an indirect light path and high brightness LEDs, the LEDs being oriented to inject light into the edge of a transparent sheet or plate (i.e., graphic panel) rather than directly illuminating the front or rear surface of the graphic panel, providing a compact, durable and efficient illuminated sign.

It is also an object of the invention to provide even illumination of graphics that are in close optical relationship with a graphic panel, using a line of discrete LED light sources.

It is a further object of the invention to provide a method of evenly illuminating the entire surface of a graphic panel such that a change in graphic design can be effected without altering the illumination means.

It is also an object of the invention to provide a method of producing effective illumination of areas below the graphic panel (downlighting) without a supplemental lighting source.

It is another an object of the invention to reduce the electrical power required to provide an illuminated graphic panel using LEDs.

It is another object of the invention to substantially improve the service life span of illuminated signs.

It is another object of the invention to reduce the thickness of illuminated graphic panels, while retaining good illumination characteristics.

These and other objects are accomplished by an illuminated sign using indirect illumination of graphic indicia and high brightness LEDs. The sign has a graphic panel comprising transparent or translucent material for the transmission of light, the LEDs being oriented to inject light into the edge of the graphic panel. The LEDs can be oriented such that the light beams emitted by the LEDs is aimed directly at the edge of the graphic panel, or alternatively a properly positioned reflector can be used to reflect light emitted from the LEDs into the edge of the graphic panel.

The graphic panel surfaces to which the light beams are directed are optimally smooth and polished for maximum brightness due to efficient transmission of light. It is also possible to use a diffuse surface, for example an etched surface on the illuminated edge, or all around exposed edges of a panel, which preferably is glass, polycarbonate or the like. Graphics can be applied to the graphic panel via several methods such as engraving, silk screening, paint or the like.

The edge of the graphic panel opposite from the LEDs (lower edge) can be partially or completely covered with a reflective coating in order to reflect light striking the lower edge back into the graphic panel. Discrete areas of the lower edge can be left uncovered such that a portion of the light that strikes the lower edge is allowed to pass through the graphic panel and provide downlighting of areas below the graphic panel. LED downlighting is very efficient due to the extremely narrow (i.e. focused) beam of light emitted from the LEDs.

The invention addresses a longstanding problem associated with LED illumination systems by providing for an efficient means of producing uniform illumination using edge lighting using these very discrete light sources. The illuminated sign system of the invention requires less power and has a significantly longer life span than incandescent and fluorescent systems. Additionally LED edge lighting allows for light weight, low profile illuminated signs.

BRIEF DESCRIPTION OF THE DRAWINGS

There are shown in the drawings the embodiments of the invention as presently preferred. It should be understood, however, that the invention is not limited to the precise arrangements and instrumentalities depicted as exemplary embodiments, and is capable of variations in keeping with the invention as claimed.

DETAILED DESCRIPTION OF THE PREFERRED EMBODIMENTS

Figure 1:
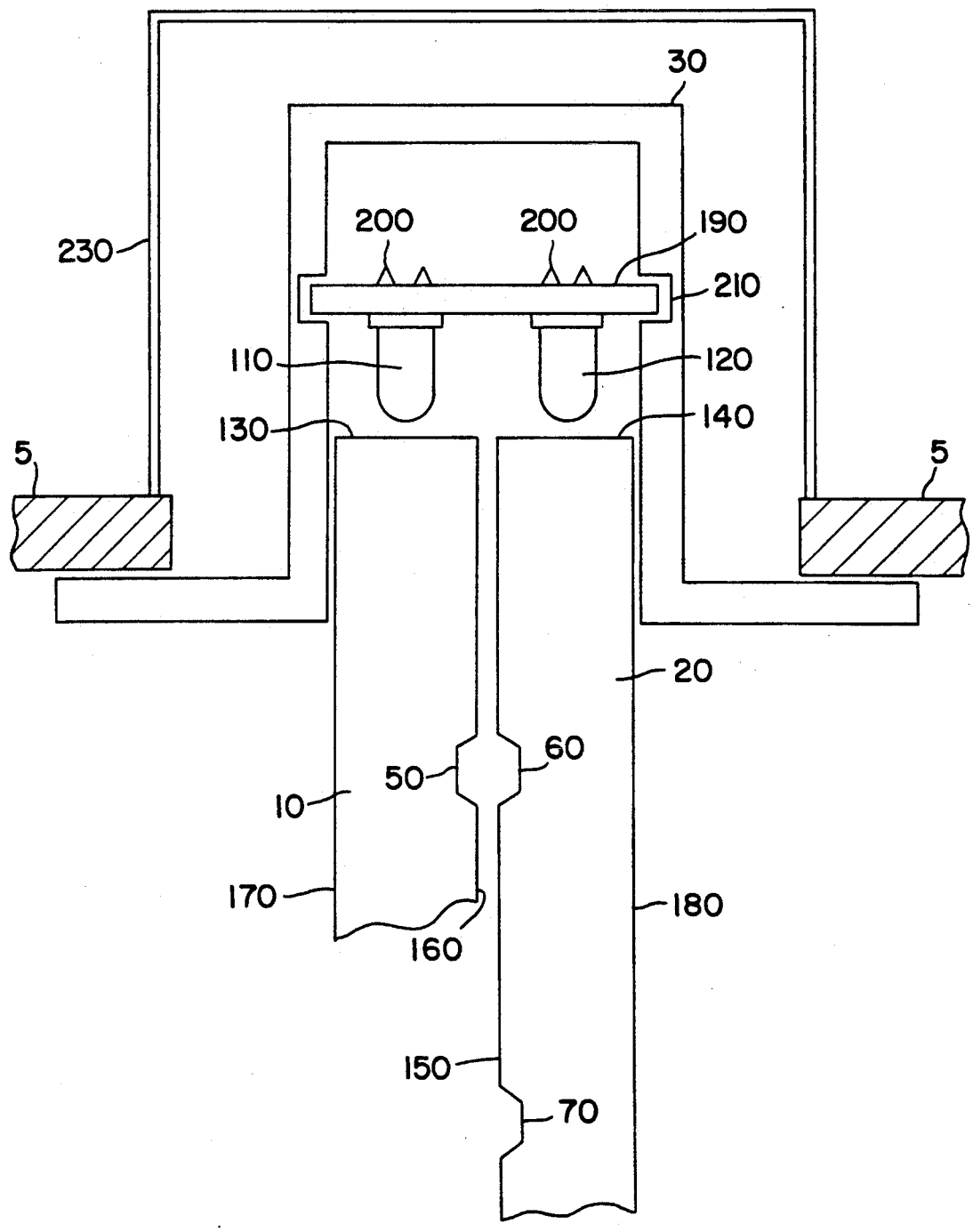
FIG. 1 is a section view through the sign apparatus, perpendicular to the viewable surfaces of the graphic panels, showing the orientation of the graphic panels and the LEDs in a configuration incorporating two graphic panels.

The sign apparatus of the invention as applied, for example, to a ceiling fixture with two graphic panels is shown in FIG. 1 along a section perpendicular to the viewable surface of the graphic panels. In this view a rough-in box 230 is fitted into the ceiling in order to retain the sign apparatus. An opening in the ceiling panels 5 is provided so that the rough-in box can be installed within the ceiling. Although FIG. 1 shows a ceiling mounted fixture, the invention is suitable for other methods of attachment such as mounting on a wall or post. Two graphic panels 10, 20 are retained in a housing 30, the housing fitted with appropriate means of retaining graphic panels 10, 20 within close proximity to the LEDs 110, 120. When assembled, the overall arrangement is substantially solid in that the glass or plastic panels rest closely adjacent one another and are captive in the housing.

The graphic panels 10, 20 can be manufactured out of any material which has a suitable opacity for efficient transmission of light, such as transparent or translucent plastic (e.g., Lexan). Tempered glass may also be used, however plastic has superior impact resistance and a plastic panel is easier to cut, polish, engrave and paint. The graphic panels 10, 20 are illuminated by light emitted from LEDs 110, 120, the light being aimed directly at the top edges of the graphic panels 130, 140, which preferably are flat but also can be rounded for a lens effect. While FIG. 1 is a sectional view and only one LED per panel is shown, it should be understood that more than one LED per panel is normally required for adequate lighting. The LEDs can be spaced along the edge of the graphic panel, and for even more light, more than one row can illuminate the edge of the panel(s). The number of LEDs required depends on the size of the panel, the desired brightness and the intensity of the LED used. The top edges of the graphic panels 130, 140 preferably are smooth and polished for optimal transmission of light. However it is also possible to use an unevenly finished edge, for example etched (for glass) or sanded (for plastic), providing a diffuser for the light. Of course such a diffuser also would attenuate the light.

The light injected into the edges 130, 140 of the graphic panels is reflected internally within the graphic panel causing the light to become diffused. No diffusing sheet is needed between the LEDs and the graphic panels. The edge lighting arrangement is very efficient for light transmission due to the geometry employed. Whereas the light source LEDs are incident on the edges of the panels, which are placed at a space above the lower edge of the housing, a large proportion of the light emitted is incident on the interface between the air and glass (or plastic) at a relatively low angle of incidence. All light rays which are oriented at less than the critical angle of about 40° are totally internally reflected, and thus are transmitted generally through the panels. The effect can be further improved by providing polished edges and reflectors along the edges of the panels, in particular the bottom edge. Because of the efficiency of the internal reflection within the graphic panel, a smaller number of LEDs is required to produce a given graphic brightness. Fewer LEDs result in lower production costs and lower operation costs since less power is consumed.

The efficiency of light transmission can be further improved by smoothing and polishing all surfaces of the graphic panels and applying a high reflectivity paint to the rear surface of the graphic panels 150, 160. Polished surfaces improve the efficiency of the internal reflections within the graphic panel and thus improve contrast. The addition of high reflectivity paint on the rear surface of the panels 150, 160 allows for highly uniform illumination of graphics on the front of the graphic panels 170, 180.

Graphics can be applied to the graphic panels by any of a number of methods which cause variations in opacity, diffuseness, color or the like. Examples are etching, engraving, painting, silk screening or other forms of printing. Etching can be performed on the front or rear surface of the graphic panels as illustrated by grooves 50, 60 and 70 which are shown as trapezoidal in profile. The grooves pick up reflected light and appear brighter than the general background. Different illumination effects can be obtained by varying the shape and depth of the grooves.

Painted graphics must be in optical contact with the surface of the graphic panel (i.e., physically touching the surface or formed in the surface) for efficient illumination. Optimally the LED color should closely match the color of the graphics applied to the graphic panels, maximum illumination is thereby possible since the graphics reflect the same color of light that the LED emits. Painted graphics can be made even more visible by using fluorescent paint.

The LEDs 110, 120 are mounted in a printed circuit board 190 in a conventional manner, e.g., by soldering the leads 200 (i.e. anode and cathode) to the printed circuit panel such that the LEDs are appropriately oriented. The printed circuit panel can be retained in the housing 30 by grooves 210 or other means such as a suitable flange extending inwardly to provide a mounting surface. Power for the printed circuit card is supplied via a power supply and drivers for the LEDs. The power supply circuitry can be located outside the housing but within the rough-in box 230. The power is normally standard 120 volts AC, rectified and regulated down to a DC voltage for driving the LEDs. In connection with an emergency exit sign or the like, a combination of a rechargeable backup battery and normal AC power can be used to provide uninterruptible power.

Figure 2:
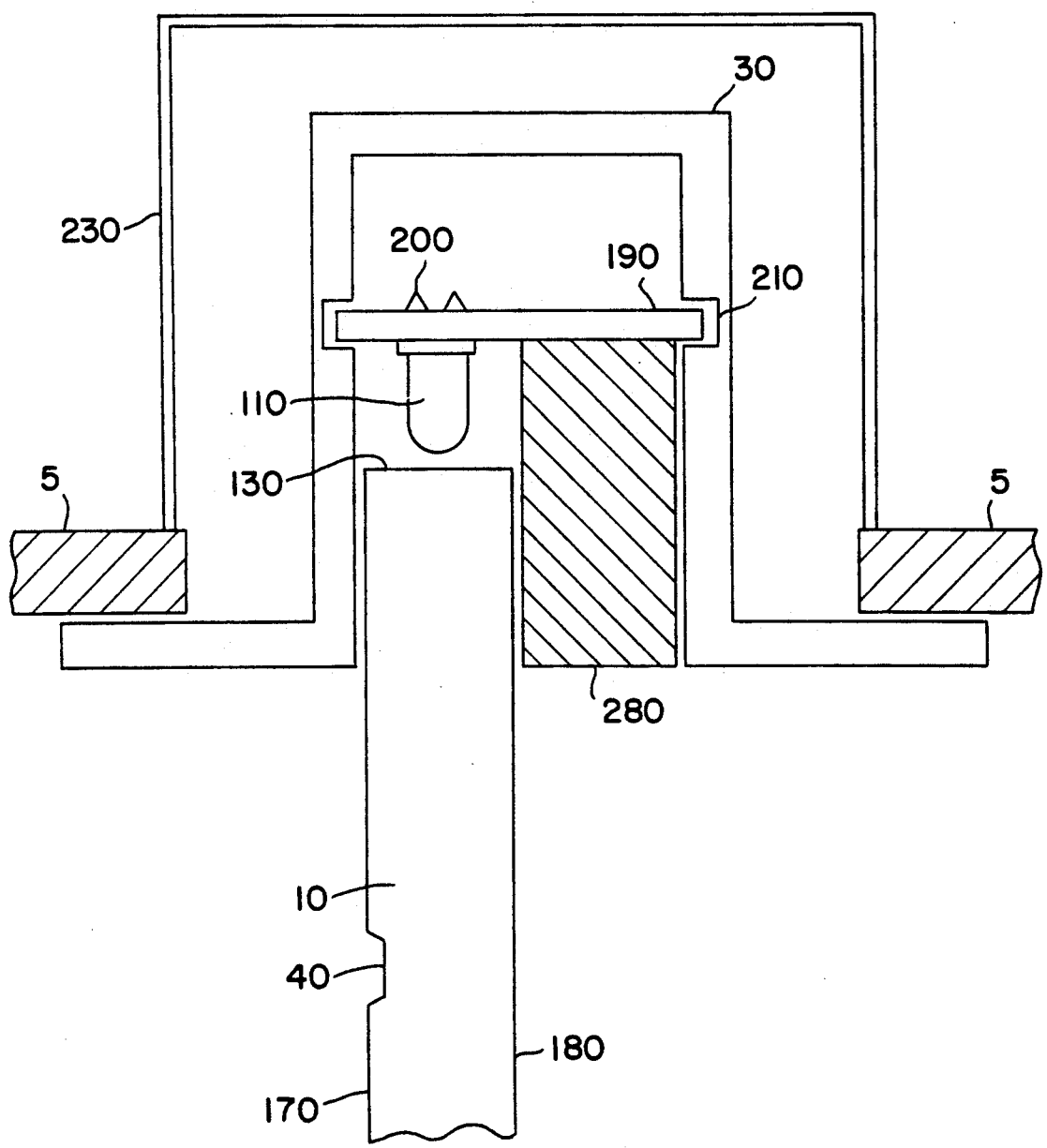
FIG. 2 is a section view through the sign apparatus, perpendicular to the viewable surface of the graphic panel, showing the orientation of the graphic panel and the LEDs in a configuration incorporating a single graphic panel.

FIG. 2 shows an alternative embodiment wherein only a single graphic panel is used. The second graphic panel 20 and second LED row, as shown in FIG. 1, are not included. Filler strip 280 is installed such that graphic panel 10 is retained in the same fashion as in a sign system incorporating two graphic panels. Filler strip 280 can be manufactured out of virtually any material, however a flexible resilient material such as a rubber or plastic is optimal for compensating for any variations in the housing 30 and or graphic panel 10. The filler strip allows the same form of graphic panel to be used in both single and duel panel systems. As in shown in FIG. 1 the graphic panel can be etched with graphics on the front or rear surface, in this case graphic panel 10 is shown with etched graphics 40 on the front surface.

Figure 3:
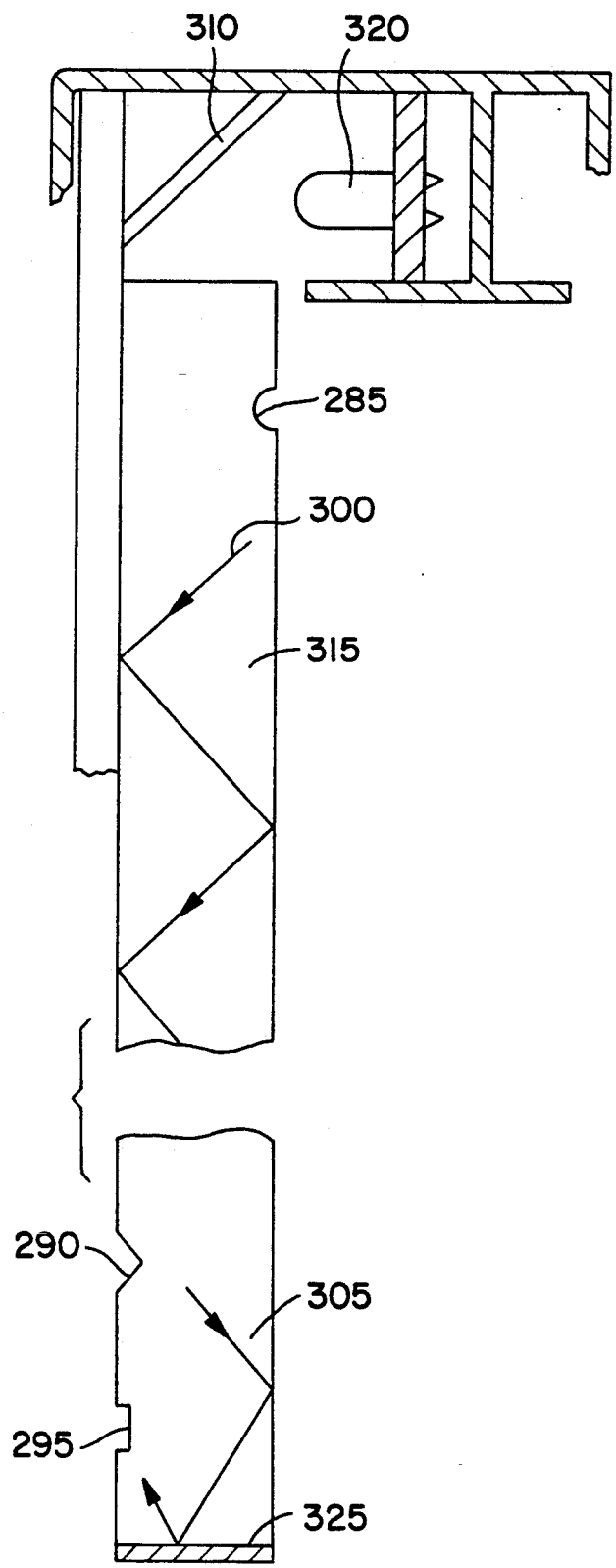
FIG. 3 is a partial section view through the sign apparatus, perpendicular to the viewable surface of the graphic panel, showing the orientation of the graphic panel and the LEDs in a configuration incorporating a single graphic panel and a reflective mirror, the light emitted from the LEDs being reflected by the mirror into the edge of the graphic panel.

FIG. 3 shows an alternative embodiment wherein a reflective mirror 310 is positioned to reflect the light emitted from LED 320 into the edge of graphic panel 315. Mirror 310 is shown at basically a 45° angle, however it would also be possible to place LED 320 at some angle other than 90° with respect to graphic panel 315, the mirror 310 being positioned at the angle necessary to direct the emitted light into the panel. The embodiment shown in FIG. 3 is particularly useful for signs that will not be installed in a ceiling since the illuminating LEDs need not be placed along the top edge of the graphic panel. The illuminating LEDs can be positioned to inject light into any edge of the graphic panel, allowing for extremely low profile illuminated signs that can be mounted virtually anywhere. LED 320 can be aimed such that emitted light is reflected off the internal surfaces of graphic panel 315 as shown by light beams 300, 305. The lower surface of the graphic panel 315 can be covered with a reflective material 325 such that light striking the lower surface is reflected back into the graphic panel as shown by light beam 305. The front surfaces of the graphic panel can be etched as shown by circular profile groove 285, or the rear surface of the graphic panel can be etched as shown by triangular profile groove 290 and rectangular profile groove 295. Etching on the front surface has the advantage of eliminating parallax and refraction effects that occur when etching is viewed though a transparent panel. However etching on the rear of the graphic panel is advantageous in that the grooves can be enclosed in the housing keeping then free from frontal impact and the accumulation of dust.

Figure 5:
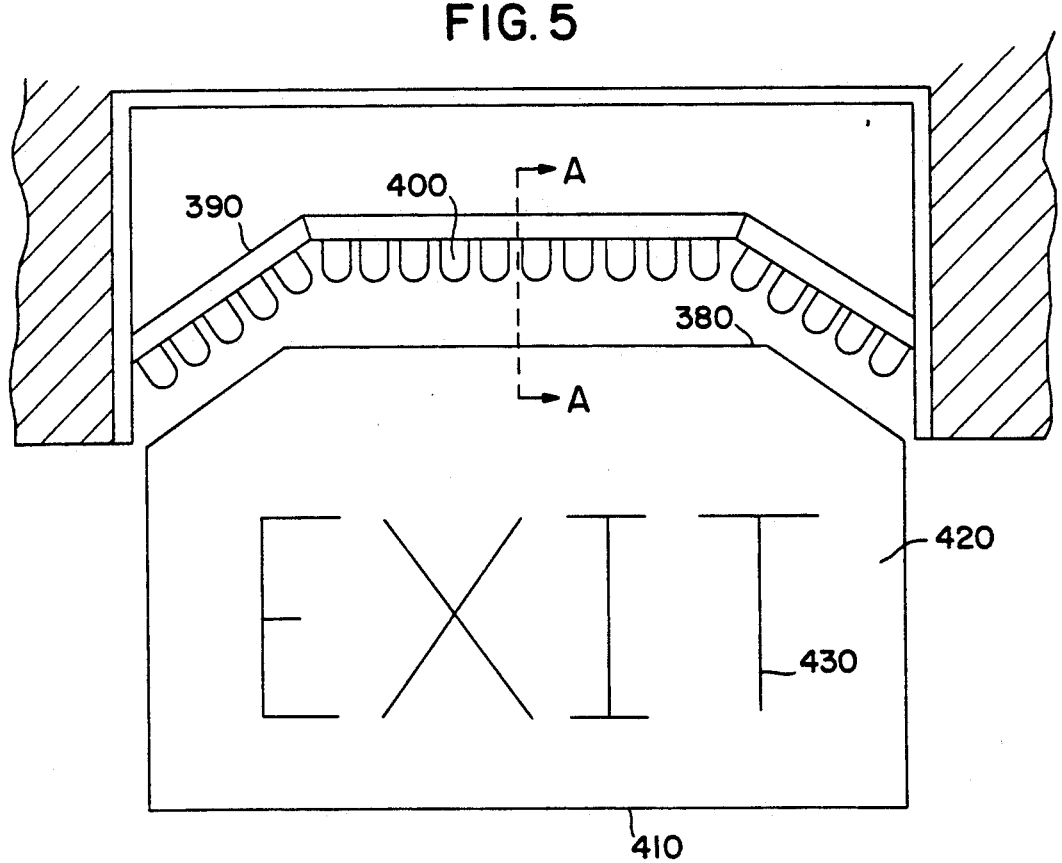
FIG. 5 is a partial section view through the sign apparatus parallel to the viewable surface of the graphic panels, showing the orientation of the graphic panel and the LEDs, the graphic panels having a trapezoidal top profile.

FIG. 5 shows an alternative embodiment of the invention wherein the graphic panel 420 has a modified top edge profile 380, and the LEDs are retained in a "U" shaped channel 390. The top edge profile 380 is shown as trapezoidal, however other profiles can also be used. Graphics 430 etched on the graphic panel 420 are shown as the word "EXIT". LEDs positioned along the horizontal portion of the "U" shaped channel provide the greatest illumination of horizontal graphic elements, such as the horizontal portions of the letters "E", "I", or "T". The LEDs positioned on the angled portion of "U" shaped channel 390 provide improved illumination of the vertical graphic elements, such as the vertical portions of the "E", "I", or "T". The orientation of the LEDs as shown in FIG. 5 allows for improved uniformity of illumination of graphics that contain both horizontal and vertical elements.

Light emitted from the LEDs positioned on the horizontal section of the "U" channel will strike the lower edge of the graphic panel 410. The graphic panel 420 can be prepared to allow some or all of the light to pass though the graphic panel by leaving gaps in any reflective material applied to the lower edge 410. Light that passes through the lower edge of the graphic panel is still highly focused, due to the narrow beam of light emitted from the LEDs as well as to internal reflections. The light passing through lower edge 410 is directed down, producing downlighting of areas below the graphic panel. Downlighting of the type produced by the invention highly efficient when compared to downlighting produced by incandescent or fluorescent edge lighting designs since the light produced by incandescent or fluorescent light sources is relatively un-focused and tends to be too diffuse to provide effective downlighting. Obviously as more light is allocated for downlighting (i.e., less reflective coating is applied to lower edge 410) additional LEDs must be provided for comparable illumination of the graphics.

Figure 4:
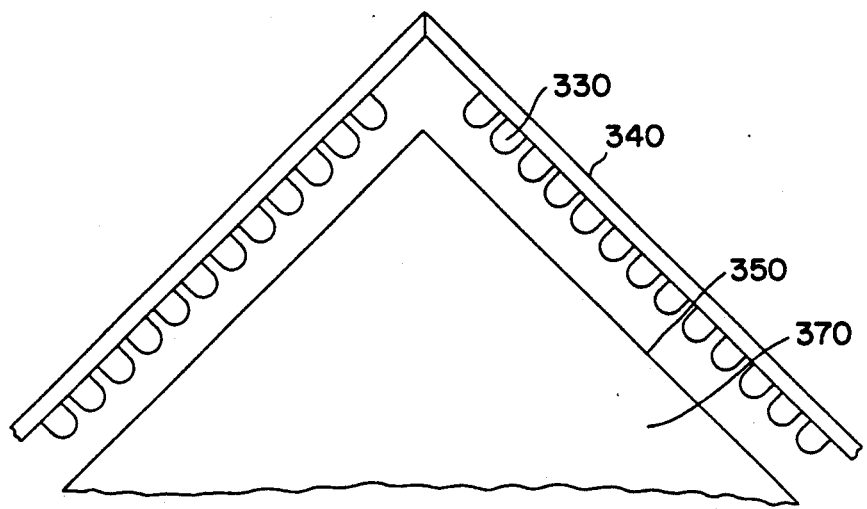
FIG. 4 is a partial section view associated with FIG. 5 showing the top edge of the graphic panel with a triangular top profile.

FIG. 4 shows an alternative embodiment in which the graphic panel 370 has a triangular top edge profile 350 with LEDs 330 that are retained in a "U" shaped channel 340. The triangular profile has the added advantage in that all LEDs can illuminate both horizontal and vertical elements of graphics etched into the graphic panel 370. Modified top edge profiles as shown in FIG. 4 and FIG. 5 greatly improve the illumination of vertical graphic elements without the need for placing LEDs along the vertical edges of the graphic panel. Additionally modified top edge profiles provide for increased surface area into which light can be injected thereby allowing for increased graphic brightness.

Figure 6:
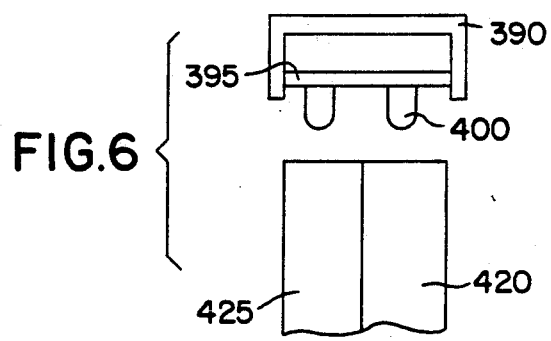
FIG. 6 is a fragmentary sectional view through the sign apparatus, taken in the direction of arrow A in FIG. 5, showing the orientation of two graphic panels and the LEDs, the LEDs contained in a U shaped channel.

FIG. 6 is a fragmentary sectional view through the sign apparatus, taken in the direction of arrow A in FIG. 5, showing the orientation of two graphic panels 420, 425 and the LEDs 400, the LEDs retained in the "U" shaped channel 390. The LEDs are mounted to a printed circuit panel 395, the printed circuit panel being retained in the "U" shape channel by an appropriate means such as retaining grooves or a suitable flange extending inwardly from the edges of the "U" shaped channel to provide a mounting surface.

Figure 7:
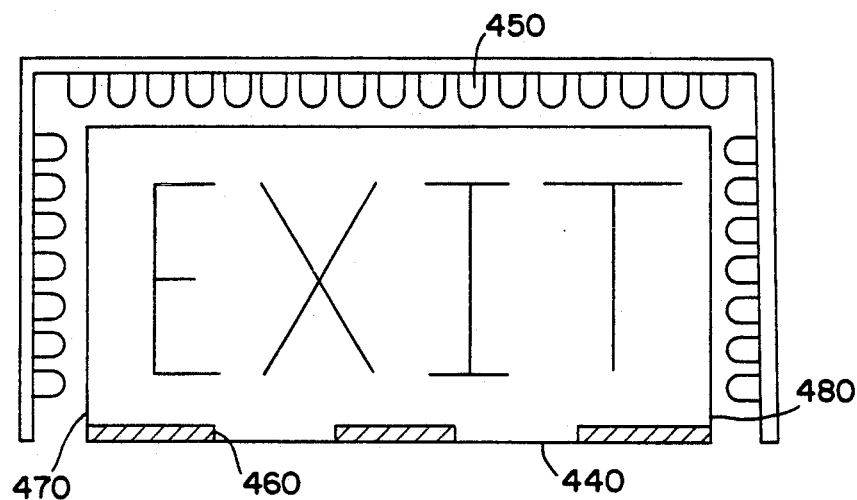
FIG. 7 is a partial sectional view through the sign, showing the orientation of LEDs to inject light into three sides of the graphic panel, the bottom edge of the graphic panel having three sections coated with reflective paint, the areas not painted with reflective paint allowing light to pass though the graphic panel producing downlighting below the graphic panel; and, FIG. 8 is a partial sectional view through the sign showing a low profile configuration similar to FIG. 3 but with the LED parallel to the plane of the graphic panel.

FIG. 7 shows an alternative embodiment which uses LEDs placed on three edges of the graphic panel. The bottom edge of the graphic panel 440 is covered with a reflective coating 460 in discrete areas, such that light from the top LEDs 450 that strikes the reflective coating is reflected back into the graphic panel. Light from the top LEDs that strikes the lower surface 440 where no reflective coating is present passes through the graphic panel and produces downlighting. LEDs aligned on the left and right edges of the graphic panel 470, 480 can provide additional lighting in order to compensate for light that has been allocated for downlighting. The configuration shown in FIG. 7 would provide both improved downlighting and improved graphics illumination over the configurations shown in FIGS. 4 and 5, and could be used in those applications requiring the increased graphic brightness. The increase in graphic brightness comes at the concession of increased cost and power consumption due to the additional LEDs positioned along the sides of the graphic panel.

Figure 8:
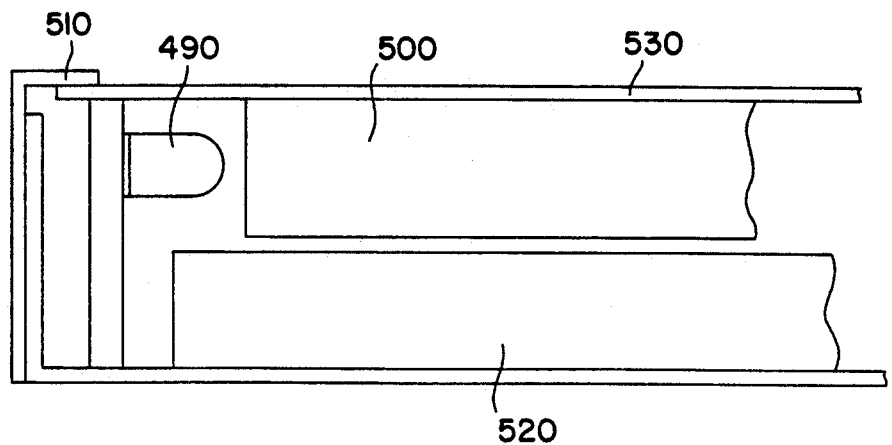

FIG. 8 shows an alternative configuration similar to FIG. 3 however LED 490 is aligned to emit light directly into the edge of graphic panel 500 in an orientation parallel to the plane of the graphic panel. Spacers 520, 530 provided adequate support and rigidity to the structure and can be used as need depending on the application. The entire LED graphic panel combination is retained within a low profile housing 510. The graphic panel LED configuration as shown in FIG. 3 can be produced with a profile of ½ inch or less. This configuration can be useful for replacement LED graphic panels used to retrofit existing lighting systems.

Typical illumination systems, which use lamps placed behind the graphic panels to illuminate the graphic panel from the rear, are susceptible to frontal impacts. The sign apparatus of the invention injects light into the edge of the graphic panel allows for location of the light source away from the graphic panel such that the light source is much less likely to be damaged by a frontal impact. In addition to inherent ruggedness of edge lit configurations, edge lighting allows for extremely low profile designs. Whereas the LED form of light source is also rugged and long-lived, the invention provides a very durable illuminated sign at modest expense.

Graphic panels and LED arrays can be manufactured as replacement components to be installed in existing fixtures. Replacement lighted panels allow for the benefits of LED lighting without the cost of replacing the entire lighting fixture. Commercial buildings which are required to have illuminated exit signs could benefit by upgrading existing sign systems with LED edge lit panels which would provide the same level of graphic brightness while requiring less power. Savings in power consumption for a large building could be substantial.

The invention having been disclosed, a number of alternatives and variations will now become apparent to persons skilled in the art. Reference should be made to the appended claims rather than the foregoing specification as defining the scope of the invention in which exclusive rights are claimed.

I claim:

1. An illuminated sign comprising:
   a panel of substantially light transmissive material having a front surface, a rear surface, and an edge surface;
   a plurality of discrete LED light sources mounted along the edge surface, each emitting a beam of light into the panel at the edge surface, said beam of light having a color wavelength defined by the LED light sources
   an inwardly reflective surface defined on the panel at least at one of an area of said edge surface, apart from the LED light sources, and said front and rear surfaces of the panel, whereby the beam of light is reflected inwardly of the surfaces and edge of the panel;
   a coating on the panel that is colored to match substantially the color wavelength of the LED light sources, whereby the light reflected inwardly causes the coating to glow; and,
   opaque means delimiting the coating on the panel to define a graphic indicia.

2. The illuminated sign according to claim 1, wherein the panel surfaces are prepared for optimal transmission of light.

3. The illuminated sign according to claim 2, wherein at least a portion of the edge surface of the panel, directed toward the LED light sources is polished and smoothed for optimal transmission of light back into the panel.

4. The illuminated sign according to claim 1, wherein said graphic indicia are defined by at least one of the coating and a mask in optical contact with a surface of the panel.

5. The illuminated sign according to claim 4, wherein the indicia is provided by a graphic mask on the front of the panel, cut out to define the indicia.

6. The illuminated sign according to claim 4, wherein a reflective surface is provided on the rear surface of the panel.

7. The illuminated sign according to claim 4, wherein said LED light sources are oriented such that the light emitted therefrom is aimed directly at the edge surface of said panel.

8. The illuminated sign according to claim 4, further comprising a reflector disposed between the LED light sources and the edge surface of the panel, the reflector being oriented such that the light emitted from said LED light sources is directed into the panel at the edge surface.

9. The illuminated sign according to claim 4, wherein a lower edge surface opposite from said LED light sources is prepared such that light emitted from the LEDs that strikes the lower edge surface passes through the panel illuminating areas below the panel.

10. The illuminated sign according to claim 9, wherein the lower edge is polished and smoothed for optimal transmission of light.

11. The illuminated sign according to claim 4, wherein a reflective coating is provided on a portion of the edge surface opposite from said LED light sources, such that light striking said reflective coating is reflected back within the panel.

12. The illuminated sign according to claim 11, where the reflective coating is applied in discrete areas whereby the light emitted from said plurality of LED light sources that strikes the reflective coating is reflected back into the panel; portions of said edge surface opposite said LED light sources being un-coated and light that strikes said un-coated portions passes through the panel illuminating areas below the panel.

13. The illuminated sign according to claim 4, wherein the illuminated sign is an emergency exit identifier.

* * * * *